(12) United States Patent
Jean et al.

(10) Patent No.: US 6,309,993 B1
(45) Date of Patent: Oct. 30, 2001

(54) LOW-FIRE MICROWAVE DIELECTRIC COMPOSITIONS

(75) Inventors: Jau-Ho Jean; Shih-Chun Lin, both of Taipei (TW)

(73) Assignee: National Science Council of Republic of China, Taipei (TW)

( * ) Notice: Subject to any disclaimer, the term of this patent is extended or adjusted under 35 U.S.C. 154(b) by 0 days.

(21) Appl. No.: 09/301,009

(22) Filed: Apr. 28, 1999

(51) Int. Cl.⁷ .................................................... C03C 3/091
(52) U.S. Cl. .................................. 501/66; 501/32
(58) Field of Search .......................... 501/32, 66

(56) References Cited

U.S. PATENT DOCUMENTS

| | | | |
|---|---|---|---|
| 4,459,364 | * | 7/1984 | McSweeney et al. ............... 501/137 |
| 4,582,814 | * | 4/1986 | Thomas ................. 501/136 |
| 4,642,148 | * | 2/1987 | Kurihara et al. ........................ 156/89 |
| 4,939,021 | * | 7/1990 | Aoki et al. ........................... 428/209 |
| 5,786,288 | * | 7/1998 | Jean ........................................ 501/16 |
| 5,801,108 | * | 9/1998 | Huang et al. ........................... 501/32 |
| 5,821,181 | * | 10/1998 | Bethke et al. ........................... 501/8 |
| 5,872,071 | * | 2/1999 | Jean et al. ............................... 501/138 |
| 5,898,359 | * | 4/1999 | Ellis ......................................... 338/47 |
| 5,906,527 | * | 5/1999 | Shaikh et al. ............................ 445/24 |

OTHER PUBLICATIONS

Condensed Chemical Dictionary, 10th ed., Van Norstrand Reinhold Co., pp. 498–499, 1981.*

* cited by examiner

*Primary Examiner*—Daniel J. Jenkins
(74) *Attorney, Agent, or Firm*—Bacon & Thomas

(57) ABSTRACT

The present invention relates to a dielectric composition which can be densified at a temperature no higher than 1000° C. and can provide ceramic products with a dielectric constant of 20 to 45 and a quality constant of 1000 to 1300 at 7 GHz. The dielectric composition comprises 20–90 vol % borosilicate glass and 10–80 vol % $TiO_2$ ceramic. Multilayered microwave dielectric ceramic elements can be prepared by mixing the composition of the present invention with an organic solvent, a polymer binder and a plasticizer, forming a green sheet from the mixture by tape casting, screen-printing and laminating the green sheet, and then cofiring the multilayer ceramic laminate with a high electrical conductivity metal, such as Ag and Cu.

14 Claims, No Drawings

US 6,309,993 B1

LOW-FIRE MICROWAVE DIELECTRIC COMPOSITIONS

FIELD OF THE INVENTION

The present invention relates to dielectric ceramic compositions, especially to dielectric compositions for use in microwave dielectric ceramic devices. The dielectric composition of the present invention can be densified at low temperatures to provide ceramic devices with a high dielectric constant and a high quality factor.

BACKGROUND OF THE INVENTION

Recently, microwave dielectric ceramics have received increasing attention because of their applications in microwave resonators and filters where their high dielectric constant and high quality factors are required. To meet the requirement of small, thin, light mobile wireless communication systems, multilayer ceramic devices cofired with low loss conductors such as silver and copper are desired. This is also the major purpose of the present invention disclosure.

There are various microwave ceramic materials such as $TiO_2$, $Ba_2Ti_9O_{20}$, $BaTi_4O_9$, $ZrO_2$—$SnO_2$—$TiO_2$, $Ba(Zn_{1/3}Ta_{2/3})O_3$ and $(Ba,Pb)Nd_2Ti_5O_4$. However, all these materials have sintering temperatures above 1300° C. and thus cannot be cofired with highly conductive metals, such as Ag and Cu. Several approaches can be taken to reduce the densification temperature of the above ceramic dielectric systems below 1000° C. or less, such as by using fine powders, adding sintering flux or low-softening glass. Adding a low-softening borosilicate glass to pure $TiO_2$ was chosen in the present invention.

U.S. Pat. No. 5,449,652 discloses a microwave dielectric ceramic composition comprising $Bi_{(2-x)}(Zn_{(2+y)/3}Nb_{(4/3)})O_{(7-3x/2+y/3)}$ wherein $0.24<x<0.333$, $0.120<y<0.3$; and $Bi_{(1-z)}Ca_{(z)}(Zn_{(2+y)/3}Nb_{(4/3)})O_{(7-3x/2+y/3+xz/-z)}$ wherein $0<x<0.667$, $0<y<0.30$, $0<z<0.2$. The microwave dielectric ceramic composition have properties including a dielectric constant(@ 7 GHz) of 100, quality factor (@ 7 GHz) of 7000 and a temperature coefficient of 10 ppm/° C.

U.S. Pat. No. 4,674,152 describes a ceramic composition with a low dielectric constant which comprises 50–95 wt % crystallizable glass and 5–50 wt % ceramic filler. The dielectric system has a dielectric constant of 5.1–6.0. The crystallizable glass consists of 5–20 wt % lithium oxide, 60–90 wt % silicon dioxide, 1–10 wt % aluminum oxide, and 1–5 wt % alkaline metal oxide other than lithium oxide. The ceramic fillers include silicon dioxide and aluminum oxide.

U.S. Pat. No. 4,755,490 describes a ceramic composition with a low dielectric constant which comprises 10–50 wt % alumina, 0–30 wt % fused silica, and 50–60 wt % of a frit comprised of 4 wt % CaO, 12 wt % MgO, 29 wt % $B_2O_3$ and 42 wt % $SiO_2$. The dielectric composition has a sintering temperature below 1000° C., a dielectric constant of 4.5–6.1, and a linear thermal expansion coefficient of $3.9$–$4.2 \times 10^{-6}$ $K^{-1}$.

U.S. Pat. No. 5,415,945 describes a ceramic composition with a high dielectric constant which comprises 75–85 mol % $Pb(Ni_{1/3}Nb_{2/3})O_3$+0–15 mol % $PbTiO_3$+5–16.5 mol % $Pb(Zn_{1/2}W_{1/2})O_3$+$Pb(Cu_{1/3}Nb_{2/3})O_3$. The composition has a sintering temperature of 1000° C. and a dielectric constant of 1000–4000.

U.S. Pat. No. 5,262,368 describes a ceramic composition with a high dielectric constant which comprises $BaTiO_3$, $BaCuO_2$, $WO_3$ and $MoO_3$. The system has a sintering temperature of 1150° C., a dielectric constant of 2000–3000 (1 KHz) and a dielectric loss of 2.5%–16% (1 KHz).

U.S. Pat. No. 5,461,014 describes a ceramic composition with a high dielectric constant which comprises $Pb(Mg_{1/3}Nb_{2/3})O_3$ and $BaCuO_2$. The system has a sintering temperature of 1050° C., a dielectric constant of 7000–8000 (1 KHz) and a dielectric loss less than 3%.

Taiwan Patent Publication No. 159830 describes a ceramic composition with a high dielectric ceramic composition which is comprises $Pb(Mg_{1/3}Nb_{2/3})O_3$—$PbTiO_3$—$Pb(Zn_{1/3}Nb_{2/3})O_3$. The system has a sintering temperature of less than 1000° C. and a dielectric constant of 8000–10000.

In view of the above development, it is obvious that ceramic materials which have a low sintering temperature, a high dielectric constant and a high quality factor (i.e. low loss) are needed in the industry. The present invention discloses ceramic compositions which meet the above requirements.

SUMMARY OF THE INVENTION

The present invention relates to a dielectric composition which can be densified at reduced temperatures to provide microwave dielectric ceramic devices with a high dielectric constant and a high quality factor. Since the ceramic composition of the present invention can be densified at reduced temperatures, the composition can be cofirable with conductors having a low melting point and low electrical resistance such as Ag, Au and Cu.

DETAILED DESCRIPTION OF THE INVENTION

It is commonly known that pure $TiO_2$ ceramics has desirable microwave properties, such as a high dielectric constant of 100 and a high quality factor in the range of 10,000 at the microwave frequencies. Dense pure $TiO_2$ ceramic cannot be obtained by sintering at temperature below approximately 1100° C. When such materials are used for the manufacture of multilayer ceramic devices, this high sintering temperature and the necessary presence of oxygen entails the use of electrodes made from expensive precious metals such as silver-palladium. A significant reduction in the manufacturing cost of such ceramic devices can be made by the substitution of pure silver for the silver-palladium in the electrodes. This requires the sintering temperature of multilayer ceramic devices below 950° C. To achieve this reduction in processing temperatures, a low-softening-point borosilicate glass (BSG) is added to pure $TiO_2$.

Specifically, the present invention primarily relates to a dielectric composition comprising two ceramic components, borosilicate glass (BSG) and $TiO_2$ ceramic. The ratio of the two ceramics is not particularly limited, and can vary depending on the required properties of the products to be made. A preferred ratio is 20–90 vol % BSG and 10–80 vol % $TiO_2$ ceramic, and an even more preferred ratio is 20–60 vol % BSG and 40–80 vol % $TiO_2$ ceramic.

The borosilicate glass (BSG) used in the invention is regarded as glass phase, which has a softening temperature between 600 and 850° C. The term "glass" is used herein to describe ceramic compositions that melt and form glassy phase at a temperature below 1000° C. The BSG suitable for use in the invention consists essentially of, as the major components, 10–40 wt % of $B_2O_3$ and 90–60 wt % of $SiO_2$; and as the minor components, 0.1–4 wt % of $Al_2O_3$ and 0.1–4 wt % of alkali metal oxides such as $K_2O$, $Na_2O$, $Li_2O$, or a mixture thereof $TiO_2$ ceramic is defined as a "high sintering temperature ceramic phase" in the present invention. A preferred crystalline phase of $TiO_2$ is anatase rather than rutile.

The ceramic composition of the invention can be fabricated into high-frequency multilayer ceramic devices as follows: (a) preparing a slurry of (i) 70–85% by weight of a ceramic composition composed of 20–90 vol % BSG and 10–80 vol % $TiO_2$ ceramic, and (ii) 30–15% by weight of organic carriers including an organic binder; (b) casting the slurry to form a green sheet; (c) printing conductive pastes onto the green sheet; (d) laminating together a plurality of printed green sheets to form a multilayer ceramic green compact; (e) subjecting the multilayer ceramic green compact to binder burnout; and (f) sintering the multilayer ceramic green compact in air.

Without intending to limit it in any manner, the present invention will be further illustrated by the following examples.

EXAMPLE 1

625 g of borosilicate glass (BSG) powder was wet milled in 775 ml of 2-propyl alcohol by a 5-liter ball mill with 5,000 g of alumina balls. The resulting slurry was sieved with a sieve of 325 mesh and dried over an oven at 80° C. for 16 hours. The dried lumps were crushed and ground with pestle and mortar to a particle size ($D_{50}$) of about 1–3 $\mu$m. X-ray diffraction analysis indicated the produced powder was amorphous. Two commercial titanium oxides including anatase and rutile were used and had a particle size of 0.2–3 $\mu$m.

Green compacts of pure anatase (1A), rutile (1B), 40 vol %BSG+60 vol % anatase (1C) and 40 vol % BSG+60 vol % rutile (1D) were prepared as follows. The powder mixture was blended with 5 wt % of polyethylene glycol binder and 50 wt % of 1-propyl alcohol through a 3-dimension mixer for 2 hours. The resulting slurry was dried and sieved into dry powders, which were then dry pressed at 13,000 psi into green compacts of 0.3 cm in height and 1.3 cm in diameter.

Subsequently, green compacts 1A–1D were sintered in air at temperatures of 875° C. for 60 min. The green compacts were heated to 500° C. with a heating rate of 5° C./min and maintained at the temperature for one hour to remove the binder completely. The samples were then fired at a heating rate of 5° C./min up to the sintering temperatures, and the soaking period was 60 minutes.

Relative sintered densities of the densified samples were measured by the water displacement method and the results are shown in Table 1. Only the sample (1C) with 40 vol % BSG+60 vol % anatase has a relative sintered density greater than 95%. Such results were also confirmed by examining the fracture surface of the sintered bodies using scanning electron microscopy. Dielectric data show that the sample has a dielectric constant of 38 and a quality factor of 4545 at 1 MHz, and a dielectric constant of 38 and a quality factor of 1250 at 7 GHz.

EXAMPLE 2

Green compacts with 20 vol % BSG+80 vol % anatase (2A), 30 vol % BSG+70 vol % anatase (2B), 40 vol % BSG+60 vol % anatase (2C), 50 vol % BSG+50 vol % anatase (2D) and 60 vol % BSG+40 vol % anatase (2E) were prepared by the same procedures as in Example 1. The relative densities of the sintered bodies as well as the sintering conditions are listed in Table 1. It is found that the relative densities for the samples with BSG contents greater than 40 vol % were larger than 95%, which were confirmed by scanning electron microscopy. Dielectric results showed that the dielectric constant decreases with increasing BSG content, from 38 for 40 vol % to 21 for 60 vol % BSG at 7 GHz. The quality factors at 7 GHz are in the range of 990–1300.

EXAMPLE 3

Green compacts with 40 vol %BSG+60 vol % anatase were prepared by the same procedures as in Example 1. The green compacts were fired at 850° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 19 to 26 and quality factors ranging from 1780 to 2220, both at 1 MHz. For the sample fired at 850° C. for 60 minutes (3C) has a dielectric constant of 25.5 and a quality factor of 1090 at 7 GHz.

EXAMPLE 4

Green compacts with 40 vol %BSG+60 vol % anatase were prepared by the same procedures as in Example 1. The green compacts were fired at 875° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 24 to 38 and quality factors ranging from 2200 to 4500, both at 1 MHz. For the sample fired at 875° C. for 60 minutes (4C) has a dielectric constant of 38.2 and a quality factor of 1251 at 7 GHz.

EXAMPLE 5

Green compacts with 40 vol %BSG+60 vol % anatase were prepared by the same procedures as in Example 1. The green compacts were fired at 900° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 39 to 42 and quality factors ranging from 3000 to 6000, both at 1 MHz. For the sample fired at 900° C. for 60 minutes (5C) has a dielectric constant of 42.9 and a quality factor of 1139 at 7 GHz.

EXAMPLE 6

Green compacts with 50 vol %BSG+50 vol % anatase were prepared by the same procedures as in Example 1. The green compacts were fired at 850° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 15 to 18 and quality factors ranging from 1250 to 1700, both at 1 MHz. For the sample fired at 850° C. for 60 minutes (6C) has a dielectric constant of 18.5 and a quality factor of 981 at 7 GHz.

EXAMPLE 7

Green compacts with 50 vol %BSG+50 vol % anatase were prepared by the same procedures as in Example 1. The green compacts were fired at 875° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 17 to 26 and quality factors ranging from 1900 to 2200, both at 1 MHz. For the sample fired at 850° C. for 60 minutes (7C) has a dielectric constant of 26.1 and a quality factor of 996 at 7 GHz.

EXAMPLE 8

Green compacts with 50 vol %BSG+50 vol % anatase were prepared by the same procedures as in Example 1. The green compacts were fired at 900° C. for 15 (3A), 30 (3B) and 60 (3C) minutes. The relative sintered densities and dielectric properties of the sintered bodies as well as the sintering conditions are listed in Table 1. All of the test specimens reached a relative density of above 95%. Such high densities were confirmed by further examining the fracture surface of the sintered bodies using scanning electron microscopy. The sintered bodies thus obtained exhibited dielectric constants ranging from 26 to 33 and quality factors ranging from 2200 to 3000, both at 1 MHz. For the sample fired at 900° C. for 60 minutes (8C) has a dielectric constant of 33.9 and a quality factor of 1080 at 7 GHz.

As shown in Table 1, the ceramic powder mixtures of Examples 1–8 which contained BSG contents greater than 40 vol % can be densified up to a relative sintered density larger than 95% at reduced temperatures of 850–900° C. for 15–60 minutes. Thus, the sintering temperature required to density the ceramic powder mixtures is compatible with that needed for highly conductive metals such as silver or copper. Further, all these ceramic powder mixtures have a high dielectric constant (20–45 @ 7 GHz) and a proper quality factor (1000–1300 @ 7 GHz).

In addition, all the ceramic powder mixtures of Examples 1–8 can be cofired using a low melting point and a low electric resistance metal such as silver or copper to prepare multilayer ceramic devices. For the preparation of multilayer ceramic devices, the ceramic mixture is mixed with an organic solvent such as toluene or ethanol, a polymeric binder such as polyvinyl butyral (PVB), and a plasticizer such as bigutyl phthalate (DBP), to produce a slurry which is further tape-cast into a green tape 125 microns thick. The green tape can be cut to 10×10 cm in size, punched with dies of 125 microns diameter and screen-printed and filled with conductor paste such as silver or copper. The thus-made green tapes were successively stacked and laminated at a temperature of 60–100° C. under 1000–3000 psi to produce multilayer green laminates. Finally, the green ceramic laminates are binder burnout and cofired in an ambient atmosphere for densification.

The dielectric compositions of the present invention can also form ceramic bodies of various shapes using conventional processes such as dry-pressing, cold-pressing and hot-pressing. Taking the dry-pressing as an example, ceramic powders may be mixed with water and binder(s) (e.g. polyvinyl alcohol (PVA)), spray-dried and granulated to improve the fluidity of the powders, and then dry-compressed, binder burnout and densified to produce microwave dielectric ceramic products.

TABLE I

| Ex. No. | Sintering temp. (° C.) | Sintering time (min) | Relative sintered density (%) | Dielectric constant (@ 1 MHz) | Quality factor (@ 1 MHz) | Dielectric constant (@ 7 GHz) | Quality factor (@ 7 GHz) |
|---|---|---|---|---|---|---|---|
| 1A | 875 | 60 | 49.0 | — | — | — | — |
| 1B | 875 | 60 | 48.9 | — | — | — | — |
| 1C | 875 | 60 | 97.3 | 37.88 | 4545 | 38.2 | 1251 |
| 1D | 875 | 60 | 68.2 | — | — | — | — |
| 2A | 875 | 60 | 78.4 | — | — | — | — |
| 2B | 875 | 60 | 88.9 | — | — | — | — |
| 2C | 875 | 60 | 97.3 | 37.88 | 4545 | 38.2 | 1251 |
| 2D | 875 | 60 | 97.2 | 25.31 | 2083 | 26.1 | 996 |
| 2E | 875 | 60 | 98.4 | 20.05 | 2500 | 21.0 | 990 |
| 3A | 850 | 15 | 94.9 | 19.13 | 1786 | — | — |
| 3B | 850 | 30 | 95.7 | 21.57 | 2127 | — | — |
| 3C | 850 | 60 | 96.8 | 26.01 | 1852 | 25.5 | 1090 |
| 4A | 875 | 15 | 95.3 | 24.58 | 2272 | — | — |
| 4B | 875 | 30 | 96.7 | 32.63 | 2857 | — | — |
| 4C | 875 | 60 | 97.3 | 37.88 | 4545 | 38.2 | 1251 |
| 5A | 900 | 15 | 96.6 | 39.91 | 3448 | — | — |
| 5B | 900 | 30 | 97.1 | 41.73 | 6250 | — | — |
| 5C | 900 | 60 | 98.0 | 41.25 | 5000 | 42.9 | 1139 |
| 6A | 850 | 15 | 95.4 | 15.93 | 1282 | — | — |
| 6B | 850 | 30 | 95.9 | 16.56 | 1667 | — | — |
| 6C | 850 | 60 | 96.3 | 18.07 | 1667 | 18.5 | 981 |
| 7A | 875 | 15 | 96.2 | 17.79 | 1923 | — | — |
| 7B | 875 | 30 | 96.3 | 21.59 | 2040 | — | — |
| 7C | 875 | 60 | 97.2 | 25.31 | 2045 | 26.1 | 996 |
| 8A | 900 | 15 | 97.3 | 26.46 | 2325 | — | — |

TABLE I-continued

| Ex. No. | Sintering temp. (° C.) | Sintering time (min) | Relative sintered density (%) | Dielectric constant (@ 1 MHz) | Quality factor (@ 1 MHz) | Dielectric constant (@ 7 GHz) | Quality factor (@ 7 GHz) |
| --- | --- | --- | --- | --- | --- | --- | --- |
| 8B | 900 | 30 | 97.5 | 31.38 | 2777 | — | — |
| 8C | 900 | 60 | 98.1 | 33.11 | 3125 | 33.9 | 1080 |

We claim:

1. A dielectric composition comprising:
   (a) 40–90 vol % of a glass phase which is borosilicate glass; and
   (b) 10–60 vol % of a ceramic phase which is anatase form of $TiO_2$ ceramic whereby said composition forms a densified high dielectric material having a relative sintered density of at least about 95% when densified at a temperature of 850° C.–900° C. for 15–16 minutes.

2. The preferred composition of claim 1 comprising:
   (a) 40–60 vol % borosilicate glass; and
   (b) 40–60 vol % $TiO_2$ ceramic.

3. The ceramic composition as claimed in claim 1, wherein said borosilicate glass consists essentially of
   10–40% by weight of $B_2O_3$; and
   90–60% by weight of $SiO_2$.

4. The ceramic composition as claimed in claim 1, wherein said borosilicate glass further comprises
   0.1–4% by weight of $Al_2O_3$; and
   0.1–4% by weight of alkali metal oxides.

5. A slurry for use in the preparation of microwave dielectric elements comprising:
   (a) 70–85 wt % the composition of claim 1; and
   (b) 30–15 wt % organic vehicle.

6. The slurry of claim 5 wherein the organic vehicle comprises organic solvent, organic binder and organic plasticizer.

7. The slurry of claim 6 wherein the slurry is formed into a green body and then densified at a temperature no higher than 1000° C.

8. The composition of claim 1 wherein said borosilicate glass has a softening temperature between 600° C. and 850° C.

9. A densified high dielectric composition obtained by forming the composition of claim 1 into a slurry; forming a shaped green body from said slurry and then densifying the green body at a temperature of 850° C.–900° C. for 15–16 minutes.

10. A densified high dielectric composition obtained by forming the composition of claim 2 into a slurry; forming a shaped green body from said slurry and then densifying the green body at a temperature of 850° C.–900° C. for 15–16 minutes.

11. A densified high dielectric composition obtained by forming the composition of claim 3 into a slurry; forming a shaped green body from said slurry and then densifying the green body at a temperature of 850° C.–900° C. for 15–16 minutes.

12. A densified high dielectric composition obtained by forming the composition of claim 4 into a slurry; forming a shaped green body from said slurry and then densifying the green body at a temperature of 850° C.–900° C. for 15–16 minutes.

13. A densified high dielectric composition obtained by forming the composition of claim 8 into a slurry; forming a shaped green body from said slurry and then densifying the green body at a temperature of 850° C.–900° C. for 15–16 minutes.

14. The densified composition of claim 1 which has a dielectric constant of at least 19.13 at 1 Mhz.

* * * * *